(12) United States Patent
Blum

(10) Patent No.: US 9,133,363 B2
(45) Date of Patent: Sep. 15, 2015

(54) STABILIZED URETHANE BASED SURFACE COATING

(76) Inventor: Holger Blum, Teufen (CH)

( * ) Notice: Subject to any disclaimer, the term of this patent is extended or adjusted under 35 U.S.C. 154(b) by 0 days.

(21) Appl. No.: 14/375,787

(22) PCT Filed: Mar. 21, 2012

(86) PCT No.: PCT/EP2012/054994
§ 371 (c)(1),
(2), (4) Date: Jul. 30, 2014

(87) PCT Pub. No.: WO2013/139388
PCT Pub. Date: Sep. 26, 2013

(65) Prior Publication Data
US 2015/0011690 A1 Jan. 8, 2015

(51) Int. Cl.
C09D 175/04 (2006.01)
C08K 5/13 (2006.01)
C08K 5/11 (2006.01)
C08K 3/34 (2006.01)
C08G 18/08 (2006.01)
C08G 18/12 (2006.01)
C08K 5/47 (2006.01)

(52) U.S. Cl.
CPC ............ C09D 175/04 (2013.01); C08G 18/089 (2013.01); C08G 18/0885 (2013.01); C08G 18/12 (2013.01); C08K 3/34 (2013.01); C08K 5/11 (2013.01); C08K 5/13 (2013.01); C08K 5/47 (2013.01)

(58) Field of Classification Search
CPC .. C09D 175/04; C08G 18/12; C08G 18/0885; C08G 18/089; C08G 18/307; C08G 18/71; C08K 5/47; C08K 3/34; C08K 5/11; C08K 5/13
See application file for complete search history.

(56) References Cited

U.S. PATENT DOCUMENTS

| 3,479,325 A | 11/1969 | Blomeyer et al. |
| 3,856,756 A | 12/1974 | Wagner et al. |
| 4,383,070 A | 5/1983 | Markusch et al. |
| 5,338,786 A | 8/1994 | Blum |

FOREIGN PATENT DOCUMENTS

| DE | 1245590 B | 7/1967 |
| DE | 1900513 A1 | 8/1970 |
| DE | 2030316 A1 | 12/1970 |
| EP | 0275839 A1 | 7/1988 |
| EP | 0275893 A2 | 7/1988 |

OTHER PUBLICATIONS

International Search Report and Written Opinion for PCT/EP2012/054994 dated Nov. 30, 2012.
Anan'Eva, K. V., et al., "Benzazolin-2-Thiones in the Michael Reaction. 2. Reaction of Benzothiazolin- and Benzoxazolin-2-Thiones with Acrylonitrile, Acrylamide, and Methyl Acrylate in the Presence of Basic Catalysts," Chemistry of Heterocyclic Compounds, May 1986, vol. 22, No. 5, pp. 564-567. Translated from Khimiya Geterotsiklicheskikh Soedinenii, No. 5, pp. 688-690, May 1986.
Bieneman, R. A., et al., "A Method for the Formulation of Stable Pigmented Coatings Systems Based on Polyurethane Prepolymers," Symposium on Polyurethane Coatings, Official Digest, Feb. 1960. pp. 273-290.
Doyle, E. N., "The Development and Use of Polyurethane Products," 1971, pp. 77-78, McGraw-Hill, New York.
Saunders, J. H., et al., "Polyurethanes Chemistry and Technology Part II: Technology," High polymers, V. 16, Interscience Publishers, New York, 1964.

*Primary Examiner* — Kriellion Sanders
(74) *Attorney, Agent, or Firm* — Nixon Peabody LLP; Joseph Bach, Esq.

(57) ABSTRACT

An improved urethane pre-polymer-based surface coating comprising a mineral filler the improvement comprising a benzothiazolythio compound and arylsulphorylisocyanate compound. A method of delaying or preventing the cross-linking or gelation of a urethane pre-polymer-based surface coating prepared with a mineral filler, comprises adding to of the formulation the surface coating a benzothiazolythio compound and an arylsulphonylisocyanate compound in amounts effective to prevent or delay the cross-linking or gelation of the surface coating.

20 Claims, No Drawings

STABILIZED URETHANE BASED SURFACE COATING

RELATED APPLICATIONS

The present application is the national phase of International Application No. PCT/EP2012/054994, filed on Mar. 21, 2012, and the disclosure of which is hereby incorporated herein by reference in its entirety.

This invention relates to an improved mineral-filled urethane pre-polymer-based surface coating comprising free isocyanate groups that incorporates benzothiazolythio and arylsulphonylisocyanate compounds.

This improved composition delays or prevents cross-linking or gelation of the surface coating during storage.

Surface coatings are known that are based on the cross-linking of urethane pre-polymers with free isocyanate groups. These surface coatings may be compounded to include mineral components which enhance the durability and binding of the urethane coatings. However, the inclusion of these minerals accelerates the cross-linking and gelation of the surface coatings during storage. This is particularly pronounced when silicate fillers are present. Urethane pre-polymers rapidly cross-link under storage conditions even in the absence of moisture. This cross-linking leads to a progressive increase in viscosity that culminates in the gelation of the surface coating. In addition, the catalytic trimerization of the free isocyanate groups also contributes to the instability of silicate filled urethane coatings as is known to those skilled in the art. (Doyle, E. N., "The Development and Use of Polyurethane Products", New York, page 77 et seq. (1971)).

Other methods are known to reduce the reactivity of pigments utilized in coating compositions. In one method, the pigment is pre-treated with a pure isocyanate in a solvent so that all reactive groups found in the pigment are pre-reacted with the isocyanate. This protective step is conducted before adding of the urethane pre-polymer comprising terminal isocyanate groups. This prior art method, however, requires the addition of a solvent and is technically complex. (Bienemann, R. A., et al., Off. Digest 32:273 (1960); Saunders, J. H., "Polyurethane Chemistry and Technology", New York 2:533 (1964)). DE-A-1900513, DE-A-2030316, DE-C-1245590, U.S. Pat. No. 4,383,070 and EP-A-0275893 disclose methods for stabilizing preparations containing urethane pre-polymers monoisocyanates and, optionally, reactive fillers which would otherwise cross-link in the presence of moisture.

Another known way of stabilizing surface coatings which contain urethane pre-polymers comprising terminal isocyanate groups is by dissolving the pre-polymers in dimethyl formamide and adding 0.01% to 2% by weight of an ammonium salt of an organic acid as stabilizer.

Another method of stabilizing urethane pre-polymers in the presence of silicate fillers requires that the free isocyanate content of the preparation be above approximately 2.4%. When the isocyanate content is kept at this amount the storage time is extended to at least 12 months at room temperature.

Moreover, many solvent-based formulations are ineffective, because the urethane polymers geld when the solvents are evaporated in high vacuum.

Accordingly, there is still a need for an effective formulation of a mineral-filled, urethane pre-polymer based surface coating that avoid cross-linking or gelation of the pre-polymers prior to use and have prolonged storage periods.

U.S. Pat. No. 5,338,786 describes the to use certain thiophen compounds plus an arylsulphonylisocyanate to increase the storage time of urethane pre-polymers in the presence of silicate fillers, in this way providing a storage time of about 16 months. However there is a higher demand in the industry for longer storage periods, i.e. of several years. This time period can now be achieved with this new invention.

It is an object of the invention to provide improved surface coatings, based on urethane pre-polymers comprising free isocyanate groups stable to storage when formulated with mineral fillers.

This invention relates to an improved mineral-containing surface coating based on urethane pre-polymers comprising free isocyanate groups, stabilized against cross-linking and gelation that comprises (a) a benzothiazolythio compound of the chemical formula

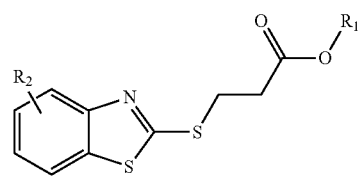

wherein $R^1$ is ($C_1$ to $C_8$) alkyl and $R^2$ is hydrogen, halogen, $NO_2$, CN, alkoxy or carbonyloxyalkyl, said halogen, $NO_2$, CN, alkoxy and carbonyloxyalkyl substituent being non-reactive with components of the surface coating and (b) an arylsulphonylisocyanate of the chemical formula

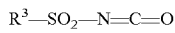

$$R^3-SO_2-N=C=O$$

wherein $R^3$ is ($C_6$-$C_{12}$) aryl or ($C_6$-$C_{12}$) aryl substituted with at least one hydrogen, halogen, $NO_2$, alkoxy or carbonyloxyalkyl substituent, and wherein said aryl substituent is non-reactive with components of the surface coating.

This invention also relates to a method of preventing the cross-linking or gelation of a urethane pre-polymer coating surface comprising a mineral filler, the method comprising adding to a urethane pre-polymer coating (a) a benzothiazolythio compound of the chemical formula

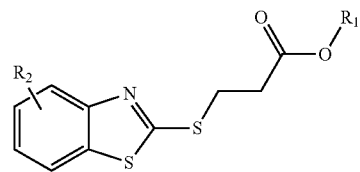

wherein $R^1$ is ($C_1$ to $C_8$) alkyl and $R^2$ is hydrogen, halogen, $NO_2$, CN, alkoxy or carbonyloxyalkyl, said halogen, $NO_2$, CN, alkoxy and carbonyloxyalkyl substituent being non-reactive with components of the surface coating and (b) an arylsulphonylisocyanate of the chemical formula

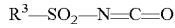

$$R^3-SO_2-N=C=O$$

wherein $R^3$ is ($C_6$ to $C_{12}$) aryl or ($C_6$ to $C_{12}$) aryl substituted with at least one hydrogen, halogen, $NO_2$, alkoxy or carbonyloxyalkyl substituent, and wherein said aryl substituent is non-reactive with components of the surface coating.

The present invention provides a surface coating with improved stability to changes in viscosity during storage in the absence of moisture. The invention provides an improved mineral-containing, urethane pre-polymer-based surface coating having an enhanced storage period. The present product affords a minimal viscosity increase which would lead to gelation.

Other objects, advantages and features of the present invention will become apparent to those skilled in the art from the following discussion.

The improvement comprises a formulation, comprising in addition to the urethane pre-polymer comprising free isocyanate groups (a) a benzothiazolythio compound of the chemical formula

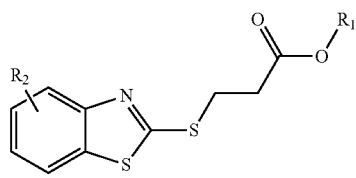

Formula I wherein $R^1$ is ($C_1$ to $C_8$) alkyl and $R^2$ is hydrogen, halogen, $NO_2$, CN, alkoxy or carbonyloxyalkyl, said halogen, $NO_2$, CN, alkoxy and carbonyloxyalkyl substituent being non-reactive with components of the surface coating and (b) an arylsulphonylisocyanate of the chemical formula $$R^3-SO_2-N=C=O \quad \text{Formula II}$$

wherein $R^3$ is ($C_6$ to $C_{12}$) aryl or ($C_6$ to $C_{12}$) aryl substituted with at least one hydrogen, halogen, $NO_2$, alkoxy or carbonyloxyalkyl substituent, and wherein said aryl substituent is non-reactive with components of the surface coating.

The stabilized surface coating prepared in accordance with a preferred embodiment of the present invention having the formula $$\{Me_2+O\}_v\{Me_2^3+O_3\}_w\{Me^2+O\}_x\{Si-O_2\}_y \{H-_2O\}_z \quad \text{Formula III}$$

is particularly effective as a formulation having concentrations of free isocyanate groups of from 0.2 to 1.4 wt. %, containing a silicate-based mineral filler of the following formula wherein $Me^+$ means at least one monovalent metal, e.g. $Na^+$ or $K^+$, $Me^{2+}$ means at least one bivalent metal, e.g. $Ca^{2+}$ or $Mg^{2+}$, $Me^{3+}$ means at least one trivalent metal, e.g. $Al^{3+}$ or $Fe^{3+}$, v is about 0.1 to 1, w is about 0.2 to 5, x is about 0.1 to 8, y is about 10 to 11 and z is about 2 to 8.

In the benzothiazolythio compound of formula I, $R^1$ is preferably a ($C_1$ to $C_8$) hydrocarbon residue. $R^2$ substituents are non-reactive with the surface coating. Examples are hydrtogen, halogens, $NO_2$, CN, alkyl, alkoxyl and carbonyloxyalkyl groups.

The arylsulphonylisocyanate compound used according to a preferred embodiment of the invention has the chemical formula $$R^3-SO_2-N'C=O$$

wherein $R^3$ is mononuclear or binuclear ($C_6$ to $C_{12}$) aryl, substituted by one or more substituents non-reactive with the surface coating. Examples of substituents are halogen $NO_2$, CN, alkyl or alkoxy. However, others are possible. Particularly preferred are phenyl-, p-tolyl-, p-cumyl- or naphthylsulphonylisocyanate.

The surface coating in accordance with a preferred embodiment of the present invention contains the benzothiazolythio derivative of formula I in an amount of 0.01 to 1.0 wt. %, preferably 0.1 to 0.3 wt. % of the pre-polymer. The arylsulphonyl isocyanate is preferably added in an amount of 0.1 to 1.0 wt. %, and more preferably 0.1 to 0.5 wt. %, of the pre-polymer.

The surface coating in accordance with a preferred embodiment of the invention described herein may be kept in sealed containers for extended periods, e.g., at least 48 months, at room temperature and sealed against humidity. Gelation does not occur within this period to the formulations of this invention. The preparations showed excellent shelf life due to the synergistic effect of the stabilizing composition disclosed herein. This degree of stabilization could not be obtained with previously known preparations.

The urethane pre-polymers comprising terminal isocyanate groups used in the present surface coatings comprise reaction products of polyols, derived from polyesters, polyethers or polybutadienes with diisocyanates of the chemical formula $$O=C=N-R_4-N=C=O$$

wherein $R.^4$ is a common mononuclear or binuclear aromatic, aliphatic or alicyclic hydrocarbon, which may be substituted by alkyl, alkoxy or halogen. The urethane pre-polymers utilized herein may be prepared with stoichiometric ratios of reactive polyol/hydroxyl groups: isocyanate groups of about 1.05 to 1.5. Under these conditions liquid, moderately viscous urethane pre-polymers are obtained.

The benzothiazolythio compound on which the above-named formula I is based may be prepared in accordance with the method given by Anan'eva, K. V.; Rozhkova, N. K.; CHCCAL; Chemistry of Heterocyclic Compounds (New York, N.Y., United States); English; 22; 5; 1986; 564-567; DOI: 10.1007/BF00519541; ISSN: 0009-3122; KGSSAQ; Khimiya Geterotsiklicheskikh Soedinenii; Russian; 22; 5; 1986; 688-690.

The stabilized surface coatings in accordance with the present invention comprise the following four components.
a) Urethane pre-polymers comprising terminal isocyanate groups.
b) Benzothiazolythio compounds of the chemical formula I.
c) Arylsulphonylisocyanate compounds of the chemical formula II.
d) Mineral fillers, in particular silicate fillers of the common formula III.

In addition to the above, additives such as anti-oxidants, reaction accelerators, plasticizers, flame-proof retarding agents, and the like, may also be included in the present formulation.

Having now generally described preferred embodiments of the invention, they will be better understood by reference to certain specific examples, which are included herein for purposes of illustration only, and are not intended to be limiting of the invention or any embodiment thereof, unless so specified.

Stability Measurement of Formulated Surface Coatings

Various preparations of mineral-containing, urethane pre-polymer-based surface coatings were formulated with and without benzothiazolythio compounds and arylsulphonylisocyanate compounds as described below.

The stability of the prepared surface coatings was measured determining gelation according to the following method. 70 ml of the formulated surface coating together with a teflonized magnetic stirrer was placed in a 110 ml glass bottle equipped with a cap having a humidity-proof seal. The bottle was nitrogen-filled, sealed and stored at room temperature.

After 30 days the sample bottles were inverted and the extent of gelation was determined by measuring the movement of the teflonized magnetic stirrer. A Hallfeld magnetic sensor was used to measure the movement of the teflonized magnetic stirrer under gravity. If the magnetic stirrer moved in the sample, the sample bottle was stored for another period of 30 days. The samples were re-examined periodically until gelation occurred.

Preparations in which the teflonized magnetic stirrer did not move were considered gelled. At this point, the storage test was discontinued and the sample bottle was opened and further examined for gelation. Triplicate bottles of each surface coating formulation were prepared. The effective storage period to gelation was taken as the period from filling until gelation of the second of three sample bottles of a preparation.

EXAMPLE 1

Preparation A (Comparative Example)

A pre-polymer having terminal isocyanate groups was prepared by reacting 7 mols of 2,4-toluylene diisocyanate 80/20 with 1 mol of polyoxypropylene triol (OH number 40.3) and 3 mols of polyoxypropylene diol (OH number 55.1) at a reaction temperature of less than 70. degree. C. 100 parts by weight of the pre-polymer comprising terminal isocyanate groups were mixed with 0.5 parts by weight of phenolic antioxidant, 1 part by weight of dibutyl tindilaurate (reaction accelerator) and 0.8 parts by weight of p-cymylsulphonylisocyanate. Subsequently diisooctyladipate (plasticizer) and talcum were admixed with stirring at a pigment volume concentration (PVC) of talcum of 10%. The content of free isocyanate groups of the converted toluylene diisocyanate was 1.0% by weight of the total preparation.

The silicate filler, talcum, had a residual moisture of 0.06% (xylol method) and a chemical composition as follows:
$SiO_2$: 59.15%
CaO: 0.15%
$Al_2O_3$: 0.26%
MgO: 31.34%
$Fe_2O_3$: 3.36%
$CO_2$: 1.76%
$H_2O$ (of ignition loss): 5.4%.

EXAMPLE 2

Preparation B (According to the Invention)

100 parts by weight of the preceding preparation A were mixed with 0.25 parts by weight of 3-(Benzothiazol-2-ylsulfanyl)-propionic acid methyl ester.

EXAMPLE 3

Preparation C (Comparative Example)

Preparation A was formulated without p-cumylsulphonyl isocyanate. 100 parts by weight of the pre-polymer preparation were mixed with 0.4 parts by weight of 3-(Benzothiazol-2-ylsulfanyl)-propionic acid methyl ester.

EXAMPLE 4

Preparation D (Comparative Example)

A pre-polymer comprising terminal isocyanate was prepared by reacting 15 mols of isophorone diisocyanate with 2 mols of polybutadiendiol of functionality 2.5 (OH number 45.2) and 8 mols of polyoxypropylene diol (OH number 55.1) at a reaction temperature of less than 70. degree. C. 100 parts by weight of this pre-polymer preparation were mixed with 0.4 parts by weight of Irganox.sup.R 1076 (antioxidant), 0.8 parts by weight of p-toluolsulphonylisocyanate. Subsequently diisoctylphthalate (plasticizer) and kaoline were admixed with stirring in amounts such that the pigment volume concentration (PVC) of kaoline was 10% and the content of free isocyanate groups from the converted isophoron diisocyanate was 0.9% by weight of the total preparation.

The silicate filler, kaoline, had a residual moisture of 0.04% (xylol method) and a chemical composition as follows:
$SiO_2$: 47.40%
CaO: 0.05%
$Al_2O_3$: 38.0%
MgO: 0.41%
$Fe_2O_3$: 0.59%
$K_2O$: 1.26%
$H_2O$ (of ignition loss): 11%

EXAMPLE 5

Preparation E (According to the Invention)

100 parts by weight of the preceding preparation D were mixed with 0.25 parts by weight of 3-(Benzothiazol-2-ylsulfanyl)-propionic acid butyl ester.

EXAMPLE 6

Preparation F (According to the Invention)

100 parts by weight of the preceding preparation D were mixed with 0.20 parts by weight of 3-(Benzothiazol-2-ylsulfanyl)-propionic acid methyl ester.

EXAMPLE 7

Preparation G (Comparative Example)

Preparation G corresponds to that of preparation D without p-toluolsulphonylisocyanate.

EXAMPLE 8

Preparation H (Comparative Example)

A pre-polymer with terminal isocyanate was prepared by prereacting 8 mols of 2,4-toluylene diisocyanate 80/20 with 1 mol of polyoxypropylene triol (OH number 40.3) and 4 mols of polydiglycoladipinate (OH number 58.2) at a reaction temperature of less than 70.degree. C.100 parts by weight of the above pre-polymer mixture were mixed with 0.5 parts by weight of a phenolic antioxidant, 0.5 parts by weight of dibutyl tindilaurate (reaction accelerator) and 0.8 parts by weight of p-toluolsulphonylisocyanate. Subsequently dipropylene glycoldibenzoate (plasticizer) and mica powder were admixed with stirring such that the pigment volume concentration (PVC) of mica was 10% and the content of free isocyanate groups from the converted toluylene diisocyanate was 0.7% by weight of the total preparation.

The silicate filler, mica, had a residual moisture of 0.06% (xylol method) and a chemical composition as follows:
$SiO_2$: 48.30%
CaO: 1.25%
$Na_2O$: 1.20%
$Al_2O_3$: 31.55%
MgO: 1.99%
$TiO_2$: 1.04%
$Fe_2O_3$: 2.36%
$K_2O$: 7.86%
$H_2O$ (of ignition loss): 4.2%

EXAMPLE 9

Preparation I (According to the Invention)

100 parts by weight of the preceding preparation H were mixed with 0.10 parts by weight of 3-(Benzothiazol-2-ylsulfanyl)-propionic acid butyl ester.

EXAMPLE 10

Preparation K (Comparative Example)

This composition corresponds to that of preparation H without p-toluolsulphonyl isocyanate.

COMPARATIVE EXAMPLE 11

Preparation L (Comparative Example, U.S. Pat. No. 5,338,786)

100 parts by weight of the preceding preparation D were mixed with 0.25 parts by weight of 1,2-diacetyl-4-(4-ethoxycarbonylbutanoyl)-1H,3H-thieno[3,4-d]imidazol-2-on e.

COMPARATIVE EXAMPLE 12

Preparation M (Comparative Example, U.S. Pat. No. 5,338,786)

100 parts by weight of the preceding preparation D were mixed with 0.20 parts by weight of 1,2-diacetyl-4-ethyl-1H,3H-thieno-[3,4d]imidazol-2-one Surface coatings of preparations B, E, F and I demonstrated gelation-free periods of greater than 48 months. Other preparations without benzothiazolythio compound or arylsulphonylisocyanate compounds had gelation-free periods of up to 15 months or less and were deemed to have inadequate shelf life. This can be seen from the following Table 1 below.

TABLE 1

Storage Period for Surface Coating Formulations

| Preparation | Shelf Life in Months | Remarks |
| --- | --- | --- |
| A | 6 | |
| B | 54 | Invention |
| C | 7 | |
| D | 5 | |
| E | 49 | Invention |
| F | 51 | Invention |
| G | 2 | |
| H | 6 | |
| I | 57 | Invention |
| K | 3 | |
| L | 15 | |
| M | 14 | |

EXAMPLE 13

Preparation of a Control Formulation 100 g mica powder were suspended in 400 ml dry toluol and stirred under nitrogen for 3 days with 6 g phenyl isocyanate at a temperature under 40.degree. C. Thereafter, the suspension was washed with toluol on a pressure filter until phenyl isocyanate could no longer be found in the outflow. 160 g toluol moist mica powder nitrogen under were prepared by this method. The silicate filler, mica, had a residual moisture of 0.05% (xylol method) and the chemical composition indicated in Table 2 below.

TABLE 2

Composition of Mica

| | | | | | |
| --- | --- | --- | --- | --- | --- |
| $SiO_2$: | 48.30% | $Al_2O_3$: | 31.55% | $Fe_2O_3$: | 2.36% |
| CaO: | 1.25% | MgO: | 1.99% | $K_2O$: | 7.86% |
| $Na_2O$: | 1.20% | $TiO_2$: | 1.04% | | |
| $H_2O$: | 4.2%. | | | | |
| (of Ignition Loss) | | | | | |

A pre-polymer comprising terminal isocyanate was prepared by pre-reacting 7 mols of 2,4-toluylene diisocyanate 80/20 with 1 mol of polyoxypropylene triol (OH number 40.3) and 3 mols of polyoxypropylene diol (OH number 55.1) at a reaction temperature of 70.degree. C.

100 parts by weight of said pre-polymer comprising terminal isocyanate groups were mixed with 0.5 parts by weight of a phenolic antioxidant, 1 part by weight of dibutyl tindilaurate (reaction accelerator).

Subsequently amounts of diisooctyladipate (plasticizer) and toluol-moist mica powder were admixed with stirring, so that the pigment volume concentration (PVC) of mica was 10% and the content of free isocyanate groups from the converted toluylene diisocyanate was 1.0 wt % of the total preparation. After two-months of storage at room temperature using the procedure described under "Stability Measurement of Formulated Surface Coatings" above, the preparation had gelled.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

The invention claimed is:

1. A mineral-filled urethane pre-polymer-based surface coating, comprising free isocyanate groups, the improvement comprising a) a benzothiazolythio compound of the chemical formula:

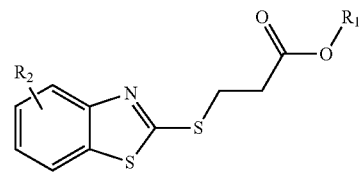

wherein $R^1$ is ($C_1$ to $C_8$)alkyl and $R^2$ is hydrogen, halogen, $NO_2$, CN, alkoxy or carbonyloxyalkyl, said halogen, $NO_2$, CN, alkoxy and carbonyloxyalkyl substituent being non-reactive with components of the surface coating:

and b) an arylsulphonylisocyanate of the chemical formula

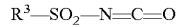

wherein $R^3$ is ($C_6$ to $C_{12}$) aryl or ($C_6$ to $C_{12}$)aryl substituted with at least one hydrogen, halogen, $NO_2$, alkoxy or carbonyloxyalkyl substituent, and wherein said aryl substituent is non-reactive with components of the surface coating.

2. The surface coating of claim 1, wherein the benzothiazolythio compound and the arylsulphonylisocyanate are present in amounts effective to prevent cross-linking or gelation of the coating.

3. The surface coating of claim 1, wherein $R^1$ is methyl or butyl or 2-ethyl-hexyl.

4. The surface coating of claim 1, wherein the benzothiazolythio compound is 3-(Benzothiazol-2-ylsulfanyl)-propionic acid alkyl ester.

5. The surface coating of claim 4, wherein the 3-(Benzothiazol-2-ylsulfanyl)-propionic acid alkyl ester is Methyl 3-(2-Benzothiazolylthio)proponiate.

6. The surface coating of claim 4, wherein the 3-(Benzothiazol-2-ylsulfanyl)-propionic acid alkyl ester is butyl 3-(2-Benzothiazolylthio)proponiate.

7. The surface coating of claim 1, wherein $R^3$ is phenyl, naphthyl, or phenyl or naphthyl, substituted with hydrogen, halogen, ($C_1$ to $C_8$)alkyl or ($C_1$ to $C_8$)alkoxy, said hydrogen, halogen, ($C_1$ to $C_8$) alkyl or ($C_1$ to $C_8$) alkoxy substituent being non-reactive with components of the surface coating.

8. The surface coating of claim 1, wherein $R^3$ a cumyl group.

9. The surface coating of claim 1, wherein $R^3$ is a toluyl group.

10. The surface coating of claim 1, wherein the mineral comprises a silicate.

11. The surface coating of claim 10, wherein the silicate comprises a member selected from the group consisting of kaoline, talcum and mica.

12. The surface coating of claim 10, wherein the silicate compound has the chemical formula

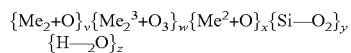

wherein Me is a cation of a valency indicated by the charge; v is about 0.1 to 1; w is about 0.2 to 5; x is about 0.1 to 8; y is about 10 to 11; and z is about 2 to 8.

13. The surface coating of claim 2, wherein the benzothiazolythio compound compound is present in an amount of about 0.01 to wt. 1.0% of the pre-polymer.

14. The surface coating of claim 13, wherein the benzothiazolythio compound compound is present in an amount of about 0.1 to 0.5 wt. % of the pre-polymer.

15. The surface coating of claim 2, wherein the arylsulphonyl monoisocyanate is present in an amount of about 0.01 to 1.0 wt. % of the pre-polymer.

16. The surface coating of claim 15, wherein the aryl sulphonylic monoisocyanate is present in an amount of about 0.1 to 0.5 wt. % pre-polymer.

17. The surface coating of claim 1, wherein the urethane pre-polymer comprises terminal isocyanate groups in an amount of 0.2 to 1.4% by weight of the total preparation.

18. The surface coating of claim 1, wherein the urethane pre-polymer comprises a reaction product of a polyester, polyether, polybutadiene, polyol or mixtures thereof with a diisocyanate of the chemical formula

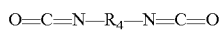

19. The surface coating of claim 1, further comprising one or more materials selected from the group of materials including anti-oxidants, reaction acceleration agents, plasticizers, flame-proof retarding agents, and metal flakes.

20. A method of preventing the cross-linking or gelation of a urethane pre-polymer surface coating comprising a mineral filler, the method comprising adding to a urethane pre-polymer coating a) a benzothiazolythio compound of the chemical formula

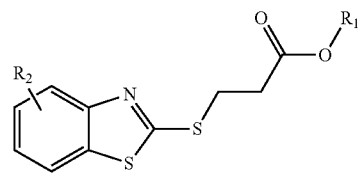

wherein $R^1$ is ($C_1$ to $C_8$)alkyl and $R^2$ is hydrogen, halogen, $NO_2$, CN, alkoxy or carbonyloxyalkyl, said halogen, $NO_2$, CN, alkoxy and carbonyloxyalkyl substituent being non-reactive with components of the surface coating; and b) an arylsulphonylisocyanate compound of the chemical formula

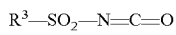

wherein $R^3$ is ($C_6$ to $C_{12}$)aryl or ($C_6$-$C_{12}$)aryl substituted with at least one hydrogen, halogen, alkyl or alkoxy, wherein the aryl substituent is non-reactive with components of the surface coating, in amounts effective to prevent or delay cross-linking or gelation of the surface coating.

* * * * *